United States Patent
Branson et al.

(10) Patent No.: US 8,127,032 B2
(45) Date of Patent: Feb. 28, 2012

(54) PERFORMANCE SAMPLING IN DISTRIBUTED SYSTEMS

(75) Inventors: Michael John Branson, Rochester, MN (US); Zachary Adam Garbow, Rochester, MN (US); David Roy Limpert, Rochester, MN (US); Candace Trielle Pederson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 981 days.

(21) Appl. No.: 11/874,685

(22) Filed: Oct. 18, 2007

(65) Prior Publication Data

US 2009/0106008 A1 Apr. 23, 2009

(51) Int. Cl.
*G06F 15/16* (2006.01)
(52) U.S. Cl. .......... 709/229; 709/203; 709/223
(58) Field of Classification Search .......... 709/203, 709/223, 229
See application file for complete search history.

(56) References Cited

U.S. PATENT DOCUMENTS

| | | | | |
|---|---|---|---|---|
| 6,370,560 | B1 * | 4/2002 | Robertazzi et al. | 718/105 |
| 6,418,462 | B1 * | 7/2002 | Xu | 709/201 |
| 6,463,457 | B1 * | 10/2002 | Armentrout et al. | 709/201 |
| 7,092,985 | B2 * | 8/2006 | Hubbard | 709/201 |
| 7,765,521 | B2 * | 7/2010 | Bryant | 717/103 |
| 7,770,175 | B2 * | 8/2010 | Flockhart et al. | 718/105 |
| 2003/0149765 | A1 * | 8/2003 | Hubbard et al. | 709/224 |
| 2003/0158887 | A1 * | 8/2003 | Megiddo | 709/201 |
| 2006/0195508 | A1 * | 8/2006 | Bernardin et al. | 709/203 |
| 2007/0124098 | A1 * | 5/2007 | Basham et al. | 702/120 |

\* cited by examiner

*Primary Examiner* — Phuoc Nguyen
(74) *Attorney, Agent, or Firm* — Patterson & Sheridan LLP

(57) ABSTRACT

One embodiment of the invention provides a method to identify a preferred system configuration for a distributed system to use for executing a given computing job. A benchmark profile may specify a collection of benchmarks representative of the job, and the collection of benchmarks may be executed across various permutations of compute nodes that are part of the distributed system. That is, the benchmark profile identifies one or more benchmarks which best represent the runtime characteristics of the computing job. The collection of benchmarks may be executed to predict the performance of the computing job using different permutations of available nodes, before deploying the job.

24 Claims, 10 Drawing Sheets

| SUBROUTINE | TRAIT | BENCHMARK | RATIO | SCALING UNIT |
|---|---|---|---|---|
| SUB 1 | I/O LATENCY | BENCHMARK 1 | 3 : 10 | 60 % |
| SUB 1 | AVAILABLE MEMORY | BENCHMARK 5 | 3 : 10 | 40 % |
| SUB 2 | I/O LATENCY | BENCHMARK 1 | 1 : 10 | 100 % |
| SUB 3 | PROCESSOR UTILIZATION | BENCHMARK 4 | 6 : 10 | 70 % |
| SUB 3 | DISK SPACE | BENCHMARK 3 | 6 : 10 | 10 % |
| SUB 3 | BANDWIDTH | BENCHMARK 2 | 6 : 10 | 20 % |

FIG. 3

| CONFIGURATION | SUBROUTINE | NODE |
|---|---|---|
| 1 | SUB 1 | NODE A |
| 1 | SUB 2 | NODE B |
| 1 | SUB 3 | NODE C |
| 2 | SUB 1 | NODE C |
| 2 | SUB 2 | NODE D |
| 2 | SUB 3 | NODE A |

FIG. 4

| CONFIGURATION | SUBROUTINE | NODE | BENCHMARK PERFORMANCE |
|---|---|---|---|
| 1 | SUB 1 | NODE A | 98 ns |
| 1 | SUB 2 | NODE B | 74 ns |
| 1 | SUB 3 | NODE C | 32 ns |
| 2 | SUB 1 | NODE C | 76 ns |
| 2 | SUB 2 | NODE D | 74 ns |
| 2 | SUB 3 | NODE A | 33 ns |

FIG. 6

PERFORMANCE SAMPLING IN DISTRIBUTED SYSTEMS

BACKGROUND OF THE INVENTION

1. Field of the Invention

Embodiments of the invention generally relate to sampling application performance of a software application running on a distributed system using a variety of system configurations.

2. Description of the Related Art

Distributed computing systems, such as grid computing and computer clusters, are useful tools for breaking down large computing tasks, or jobs, into many smaller tasks that execute concurrently. Used in this manner, distributed systems are highly effective tools to perform large computing tasks in a minimal amount of time.

Distributed systems typically contain a large number of heterogeneous computing systems each providing one or more compute nodes or processors able to perform computing tasks independently from one another. High-speed data communication networks are used to coordinate computing activity, such as inter-node messaging. Because the heterogeneous systems have different hardware architectures, each provides different advantages in executing different types of software. For example, systems with large memories provide good architectures for running database applications. Systems with a number of specialized processors are optimal for specialized processing, such as processing video images.

A benchmark is a software tool that analyzes the performance of a given hardware architecture, relative to a particular specific performance trait. A benchmark allows users to compare the efficiency of different architectures for the same performance task, allowing an optimal architecture for the software task to be determined.

Two common types of benchmarks include application benchmarks and synthetic benchmarks. Application benchmarks dynamically record performance metrics while a software application is executing. On the other hand, synthetic benchmarks mimic the performance of a piece of software on a system to predict performance metrics without actually executing the application. Both of these types of benchmarks may be used to analyze how efficient a given computer architecture is regarding different performance traits while executing (either actually or synthetically).

SUMMARY OF THE INVENTION

One embodiment of the invention provides a method of identifying a preferred configuration for executing a computing job on a distributed computing system having a plurality of compute nodes. The method may generally include, retrieving a benchmark profile associated with the computing job and generating a plurality of benchmark distribution permutations. The benchmark profile may identify a collection of benchmarks representative of the processing activity of the computing job, and each benchmark distribution permutation may specify a configuration for executing the collection of benchmarks on one or more of the plurality of compute nodes. For each benchmark distribution permutation, the collection of benchmarks is executed on the distributed system, as specified by a given benchmark distribution permutation. The method may also include recording the performance results of executing the collection of benchmarks for each different benchmark distribution permutation.

Another embodiment of the invention includes a computer-readable storage medium containing a program configured to generate a benchmark profile used to identify a preferred configuration for executing a computing job on a distributed computing system having a plurality of compute nodes. The program may be configured to perform an operation that includes retrieving a benchmark profile associated with the computing job, and generating a plurality of benchmark distribution permutations. The benchmark profile may identify a collection of benchmarks representative of the processing activity of the computing job, and each benchmark distribution permutation may specify a configuration for executing the collection of benchmarks on one or more of the plurality of compute nodes. For each benchmark distribution permutation, the collection of benchmarks is executed on the distributed system, as specified by a given benchmark distribution permutation. The operation of the program may also include recording the performance results of executing the collection of benchmarks for each different benchmark distribution permutation.

Still another embodiment of the invention includes a system having a processor and a memory containing a program configured to identify a preferred configuration for executing a computing job on a distributed computing system having a plurality of compute nodes. The program, when executed on the processor, may perform an operation of retrieving a benchmark profile associated with the computing job, and generating a plurality of benchmark distribution permutations. The benchmark profile may identify a collection of benchmarks representative of the processing activity of the computing job, and each benchmark distribution permutation may specify a configuration for executing the collection of benchmarks on one or more of the plurality of compute nodes. For each benchmark distribution permutation, the collection of benchmarks is executed on the distributed system, as specified by a given benchmark distribution permutation. The operation of the program may also include recording the performance results of executing the collection of benchmarks for each different benchmark distribution permutation.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 illustrates an example benchmark profile data structure, according to one embodiment of the invention.

FIG. 4 illustrates an example sampling configuration data structure, according to one embodiment of the invention.

FIG. 6 illustrates an example results data structure, according to one embodiment of the invention.

DETAILED DESCRIPTION OF THE PREFERRED EMBODIMENTS

Figure 1:
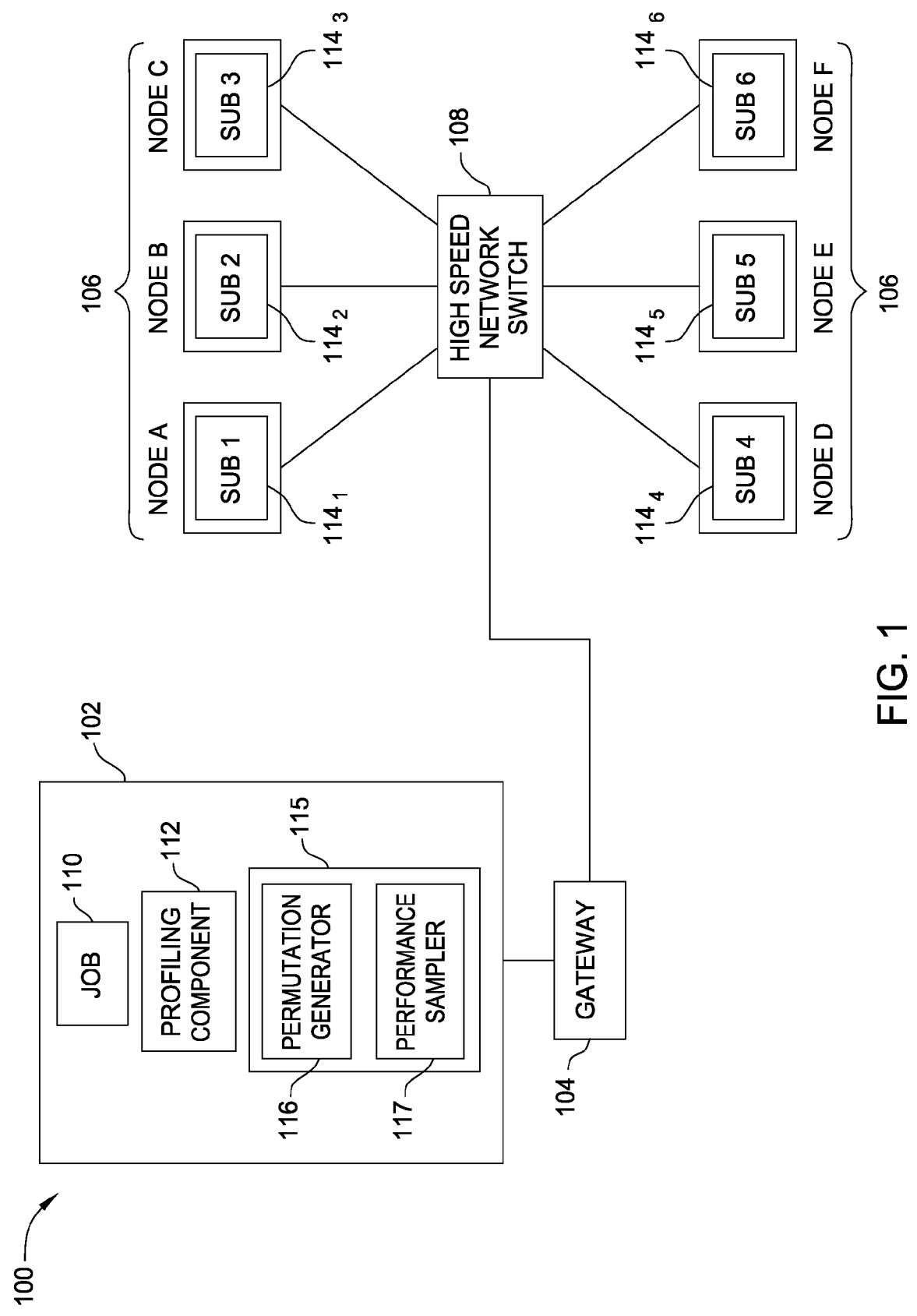
FIG. 1 illustrates a high level architecture of a computing cluster, according to one embodiment of the invention.

Currently there is a trend towards designing a computing cluster as a large collection of heterogeneous nodes, where each node may include different computing hardware. Thus, when running a given process, each node in the cluster may provide different runtime performance. The performance of a given node is dependent on many factors including processor architecture, processor speed, number of concurrent jobs, memory utilization, optimization, bandwidth, I/O, etc at any given time. Thus, while a given process may be executable on many different nodes of a heterogeneous computing cluster, determining an optimal node (or group of nodes) on which to execute a process is difficult.

To address this issue, embodiments of the invention provide a method to identify a preferred system configuration for a distributed system to use for executing a given computing job. A benchmark profile may specify a collection of benchmarks representative of the job, and the collection of benchmarks may be executed across various permutations of compute nodes that are part of the distributed system. That is, the benchmark profile identifies one or more benchmarks which best represent the runtime characteristics of the computing job. The collection of benchmarks may be executed to predict the performance of the computing job using different permutations of available nodes, before deploying the job. By comparing the performance results of the benchmarks, the distributed system may more effectively determine which nodes to deploy the job. Thus, rather than just guessing which nodes to use for the job, and then finding out that the application is running less than optimally on the chosen nodes, embodiments of the invention proactively determine which nodes to execute a job on based on a representative sampling of benchmark performance on many different combinations of nodes.

Samples are used rather than deploying the full job since a complete run of the job against different node permutations is not realistic in many situations. The job may take hours or days to run for each permutation or it may require many dependencies which are difficult to setup multiple times quickly. Instead, the benchmark profiles are used as representative samples of the job, since these can be deployed and run quickly against different node permutations, while still reflecting the runtime characteristics of the job itself.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates a high level architecture of a computing cluster 100, according to one embodiment of the invention. Of course, embodiments of the invention may be adapted use with a variety of distributed computer systems, including grid computing, stream processing, and adaptive architecture supercomputing. Accordingly, the description of the architecture shown in FIG. 1 is not intended to limit the present invention.

As shown, cluster 100 provides a conceptual representative of a Beowulf cluster (and other clustering architectures). Illustratively, cluster 100 includes a user node 102, gateway node 104, and nodes 106 connected via high-speed network switch 108. Of course, those skilled in the art will recognize that FIG. 1 provides a simplified representation of a computing cluster, and that the nodes of a typical computing cluster include a number of additional elements.

User node 102 may provide an interface to cluster 100. As such, user node 102 allows users to create, submit, and review the results of computing tasks submitted for execution on the nodes 106 of system 100. Head/gateway node 104 connects the user node 102 to the compute nodes 106. Compute nodes 106 provide the processing power of cluster 100. As is known, clusters 100 are often built from racks of commonly available personal computer components. Thus, each node 106 may include one or more CPUs, memory, hard disk storage, a connection to high speed network switch 108, and other common personal computer components.

FIG. 1 also illustrates a job 110 running on user node 102 and subroutines $114_{1-6}$ running on compute nodes 106. In one embodiment, job 110 may include a plurality of separate components, or subroutines, to be dispatched by user node 102 for execution on the compute nodes 106. Subroutines $114_{1-6}$ may each be a copy of a software application configured to execute in parallel on system 100. Alternatively, subroutines $114_{1-6}$ may be distinct applications each configured to perform a different role to accomplish a computing task. Additionally, subroutines $114_{1-6}$ may communicate over network 108 using a message passing library (e.g., the well known MPI library) to perform a coordinated computing task on nodes 106.

Users may submit job 110 for execution through an interface provided on user node 102. In turn, user node 102 may execute job 110 by dispatching each subroutine 114 of the job 110 to the compute nodes 106. Each subroutine 114 may be executed on different nodes 106 within cluster 100. Although, FIG. 1 illustrates six subroutines 114 of a compute job 110, executing on six compute nodes 106, the number of subroutines 114 and compute nodes 106 may vary depending on the compute job 110, and the distributed system 100.

In one embodiment, profiling component 112 may be configured to generate a benchmark profile, which provides a profile indicating which of one or more existing benchmarks, or portions of benchmarks, may accurately represent the runtime characteristics of job 110, and/or of one or more subroutines $114_{1-6}$. The profile execution component 115 may use the benchmark profile to invoke the appropriate benchmarks across one or more available nodes 106 to predict the likely performance of the job 110, given the current system state of cluster 100, without actually deploying the job 110.

The profiling component 112 may be configured to determine a benchmark profile for job 110 by analyzing the source code of job 110 to determine the types of operations that are performed by subroutines $114_{1-6}$, by measuring the performance characteristics of job 110 when it is executed on cluster 100 to generate a profile for future use, and/or via manual configuration by the user. In one embodiment, the benchmark profile may include a composition of individual benchmarks representative of the computing activity performed by job 110. Further, the benchmark profile may include a benchmark weighting that reflects the contribution of each benchmark's processing activity, relative to other benchmarks in the benchmark profile.

In one embodiment, profile execution component 115 may include a permutation generator 116 and a performance sampler 117. The permutation generator 116 generates benchmark-node configurations used to sample the performance of a compute job 110, for a variety of different available node configurations or different distributions of the application subroutines or components across nodes 106. A benchmark-node configuration is an assignment of the benchmarks in a benchmark profile to be executed on different nodes 106 of computing cluster 100. The performance sampler 117 may predict the performance of the compute job 110 by executing the benchmarks specified in the benchmark profile for many different node configurations and capturing the performance results.

Figure 2:
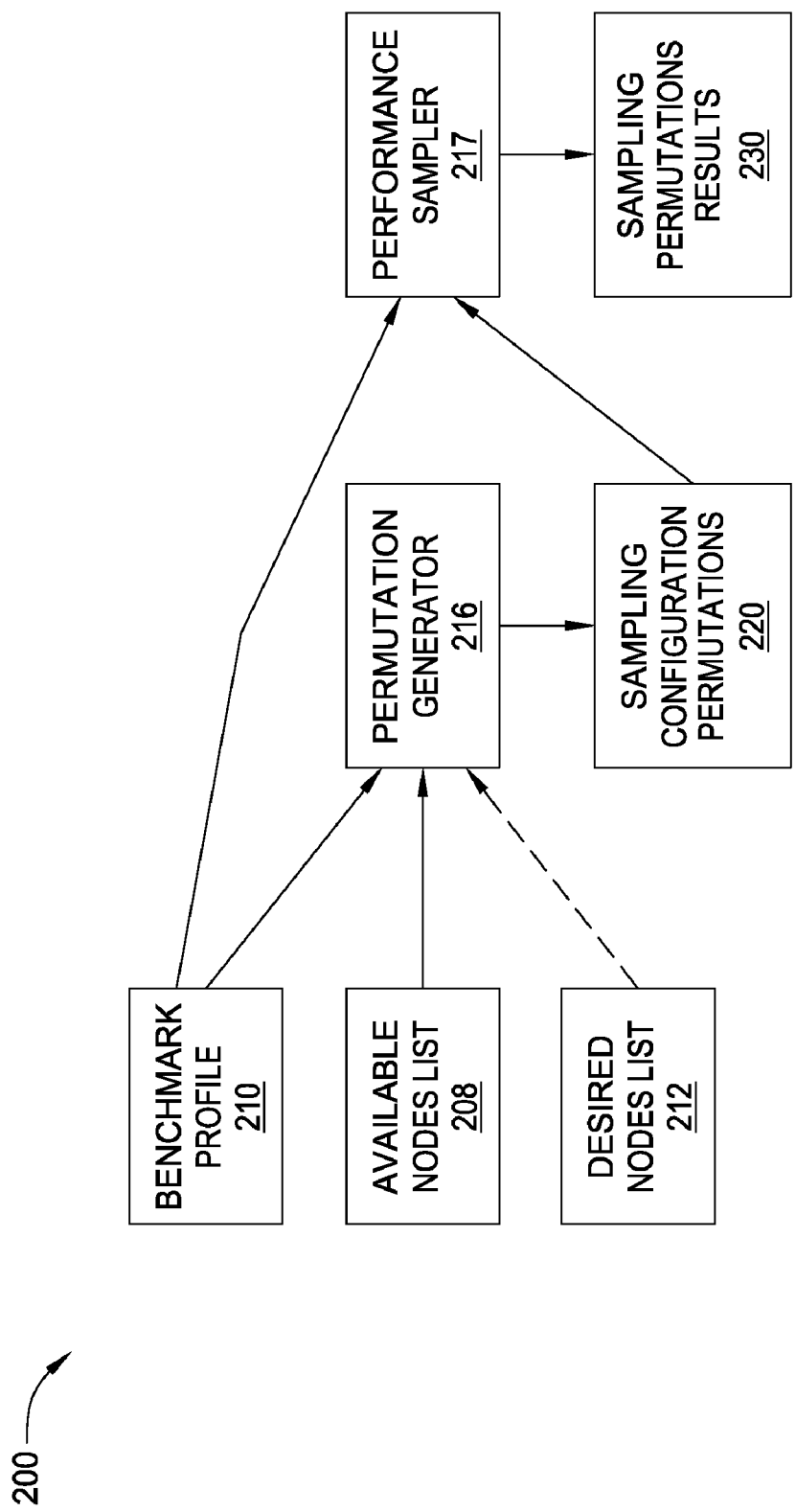
FIG. 2 illustrates a data flow diagram for a profile execution component to sample performance of a computing task, according to one embodiment of the invention.

FIG. 2 illustrates a data flow diagram 200 for a profile execution component 115 to sample the performance of a compute job 110 on a distributed system 100, according to one embodiment of the invention. As shown, data flow diagram 200 includes a benchmark profile 210, an available node list 208, a desired nodes list 212, a permutation generator 216, a performance sampler 217, sampling configuration permutations 220, and sampling results 230.

Illustratively, the permutation generator 216 receives inputs from the benchmark profile 210, the available nodes list 208, and, optionally, the desired nodes list 212, using these inputs to generate and output sampling configuration permutations 220. Each sampling configuration provides a different permutation of compute nodes from available nodes list 208 on which to execute the benchmarks in benchmark profile 210.

The benchmark profile 210 provides a profile indicating one or more existing benchmarks, or portions of benchmarks, that may accurately represent the runtime characteristics of job 110, and/or of subroutines $114_{1-6}$. The available nodes list 208 contains a list of all compute nodes 106 available for job execution on a distributed computing system 100. In some embodiments, a user may optionally designate a desired nodes list 212, containing a list of compute nodes 106 that the user prefers that the permutation generator 216 include in the configuration permutations 220. The performance sampler 217 may provide a software application configured to use the benchmark profile 210 and the sampling configuration permutations 220 to execute benchmarks of the compute job subroutines 106 in the numerous configurations specified in the sampling configuration permutations 220. Additionally, the performance sampler 217 records the performance results of each execution, and stores the results in sampling results 230.

FIG. 3 illustrates an example benchmark profile data structure 310, according to one embodiment of the invention. As shown, benchmark profile data structure 310 is defined as a table that includes a subroutine ID column 311, a performance trait column 312, a benchmark column 313, a ratio column 314, and a scaling unit column 315. In this example, benchmark profile data structure 310 represents a software application having three subroutines, each one performing the computing activities as listed in column 312.

Each entry in benchmark profile data structure 310 identifies, for a subroutine identified in subroutine column 311, a performance trait, a corresponding benchmark, a ratio of processing activity for the subroutine relative to the total processing activity for a compute job 110, and a scaling unit that reflects the amount of processing for a benchmark relative to the amount of processing for other benchmarks for the same subroutine. For example, the first row in table 310 indicates a subroutine ID of "Sub 1," a performance trait for this subroutine of "I/O latency," a benchmark corresponding to "I/O latency" of "Benchmark1," a ratio of "3:10," meaning that subroutine 1 performs three processing activities for every ten processing activities in all of job 110, and a scaling unit of "60%," meaning that Benchmark 1 performs 60% of the total processing activity for a benchmark test of job 110 for subroutine 1. The other entries in benchmark profile data structure 310 provide similar information for other subroutines and performance activities of compute job 110.

Once a benchmark profile 310 is generated to represent the performance characteristics of a given compute job, the benchmark profile 310 may be used to predict the performance of the application by running the benchmarks specified in the benchmark profile on a given configuration of a distributed system.

In one embodiment, the user may invoke the profile execution component 115 to predict or test performance of particular job on a particular system configuration. In turn, the profile execution component 115 accesses the benchmark profile 310 associated with the compute job 110 and executes the benchmarks in the profile 310 across the nodes of a distributed system, with each benchmark running for a time proportional to the scaling unit and the ratio specified in the benchmark profile. The profile execution component 115 measures the results along with the nodes 106 that the benchmarks were run against. The results can then be saved, reused, and compared against different versions of the job 110, against different system configurations sampled for job 110, or actual executions of job 110 against the a given sampling configuration.

FIG. 4 illustrates an example sampling permutations data structure 420, according to one embodiment of the invention. As shown, the sampling configuration data structure 420 provides a table that includes a configuration ID column 421, a subroutine ID column 422, and a node assignment column 423.

Each entry in the sampling configuration permutation data structure 420 identifies, for a subroutine of a performance sampling configuration, the node that the benchmark(s) for the subroutine is/are assigned to execute. For example, the first row in the table indicates a configuration "1", a subroutine, "SUB1," and a node assigned, "NODE A." The second row in the table indicates configuration, "1," subroutine, "SUB2," and node assigned, "NODE B." The third row in the table indicates configuration, "1", subroutine, "SUB3," and node assigned, "NODE C." Accordingly, for configuration "1" the performance sampler 217, executes the respective benchmarks for subroutines, "SUB1," "SUB2," and "SUB3," in a configuration, where the subroutine's benchmarks execute on, "NODE A," "NODE B," and "NODE C," respectively. The other entries in the sampling configuration data structure 420 provide similar information for a second configuration, "2," for performance sampling of compute job 110.

Figure 5A:
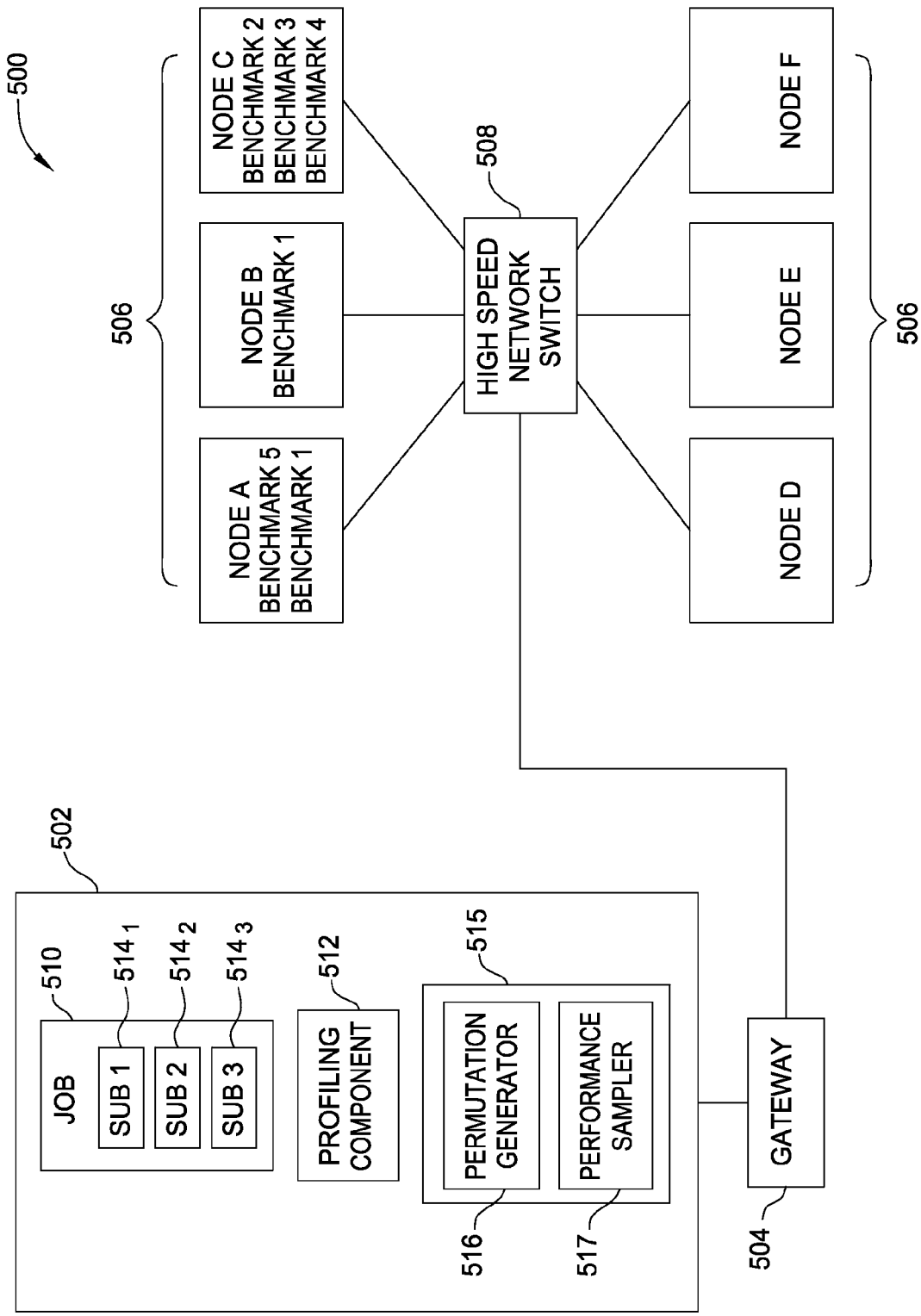
FIG. 5A illustrates an example performance sampling configuration for a compute job, according to one embodiment of the invention.

FIG. 5A illustrates an example performance sampling configuration for a compute job 510 on a distributed system 500, according to one embodiment of the invention. Illustratively, FIG. 5A shows the sampling configuration permutation for configuration "1," described in FIGS. 3 and 4.

In addition to the elements described in FIG. 1, FIG. 5A shows three subroutines, for job 510. Specifically, a "Sub 1" subroutine, a "Sub 2" subroutine, and a "Sub 3" subroutine. Additionally, "Benchmarks 1-5," are configured to execute on "Nodes A, B, and C." However, there are no jobs or benchmarks configured to execute on "Nodes D, E, and F." As is shown in FIG. 3, the subroutines, "Sub 1, 2, and 3," contain performance characteristics measured by, "Benchmarks 1 and 5," "Benchmark 1," and "Benchmarks 2, 3, and 4," respectively. Further, the performance sampling configuration "1," described in FIG. 4, assigns performance sampling for subroutines "Sub 1, 2, and 3," on "NODES A, B, and C," respectively. Accordingly, the performance sampler 217 executes "Benchmarks 1 and 5," on "Node A," "Benchmark 1," on "Node B," and "Benchmarks 2, 3, and 4," on "Node C."

Figure 5B:
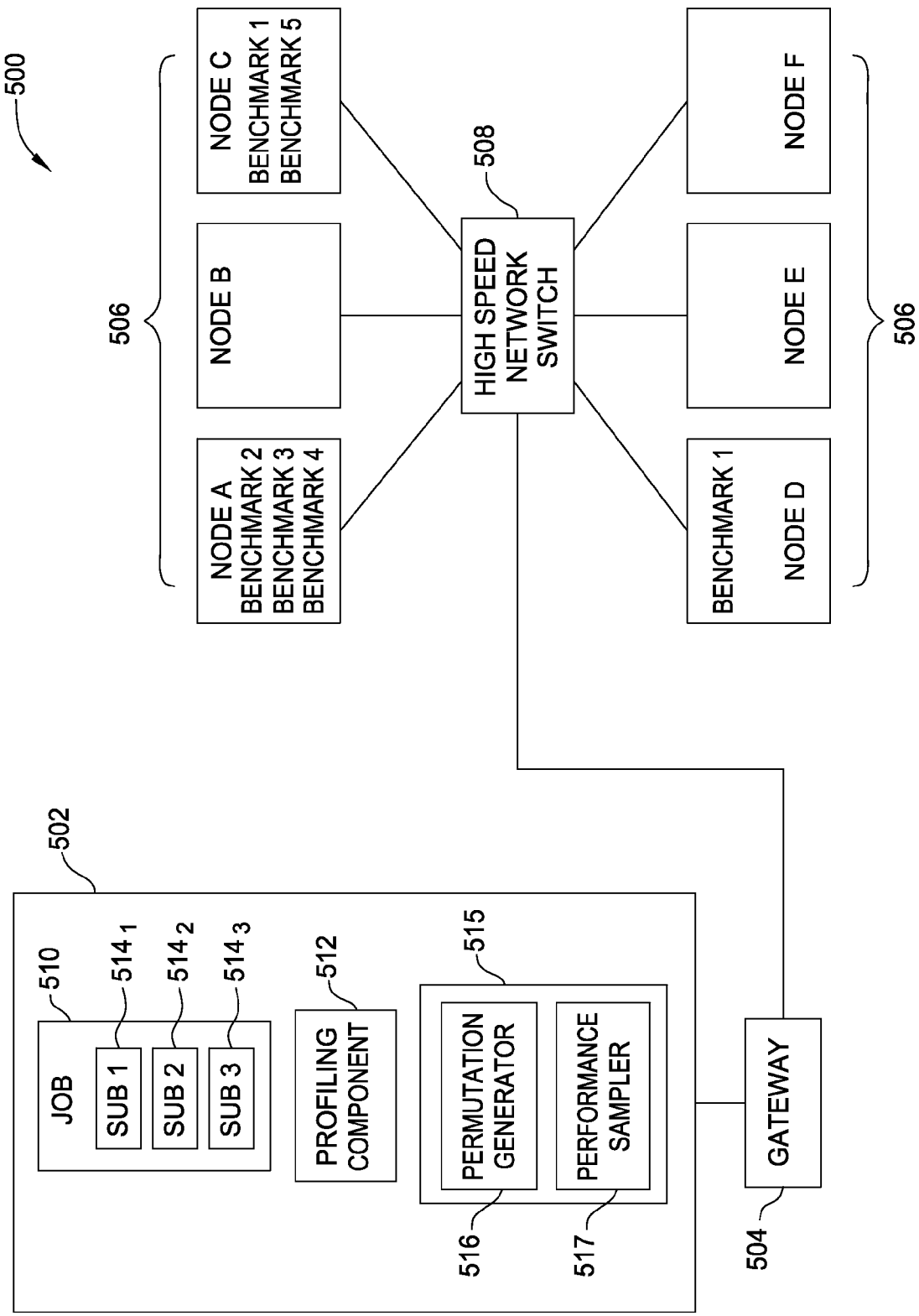
FIG. 5B illustrates an example performance sampling configuration for a compute job, according to one embodiment of the invention.

FIG. 5B illustrates an example performance sampling configuration for compute job 510 on a distributed system 500, according to one embodiment of the invention. FIG. 5B depicts the sampling configuration permutation for configuration "2," described in FIGS. 3 and 4.

In addition to the elements described in FIG. 1, FIG. 5B shows the subroutines, "Sub 1," "Sub 2," and "Sub 3" for job 510. Additionally, "Benchmarks 1-5," are configured to execute on "Nodes A, C, and D." However, there are no jobs nor benchmarks configured to execute on "Nodes B, E, and F." As is shown in FIG. 3, the subroutines, "Sub 1, 2, and 3," contain performance characteristics measured by, "Benchmarks 1 and 5," "Benchmark 1," and "Benchmarks 2, 3, and 4," respectively. Further, the performance sampling configuration "2," illustrated in FIG. 4, assigns performance sampling for subroutines "Sub 1, 2, and 3," to "Nodes C, D, and A," respectively. Accordingly, the performance sampler 217 executes "Benchmarks 2, 3, and 4," on "Node A," "Benchmarks 1 and 5," on "Node C," and "Benchmark 1," on "Node D."

FIG. 6 illustrates an example results data structure 630, according to one embodiment of the invention. As shown, results data structure 630 includes a configuration ID column 631, a subroutine ID column 632, a node column 633, and a benchmark performance column 634. Each entry in the results data structure 630 identifies, for the benchmarks of a subroutine identified in subroutine column 632, the node that the benchmarks execute on, and the performance result, e.g., execution time (or other performance metric). For example, the first row in table 630 indicates a configuration ID of "1," a subroutine ID of "Sub 1," a node of "Node A," and a benchmark performance of "98 ns." In other words, the benchmarks of subroutine, "Sub 1," (i.e., "Benchmarks 1 and 5" described in FIG. 3) execute on "Node A," in ninety-eight nanoseconds. The other entries in sampling permutations results data structure 630 provide similar information for the benchmarks of other subroutines for compute job 510.

Figure 7A:
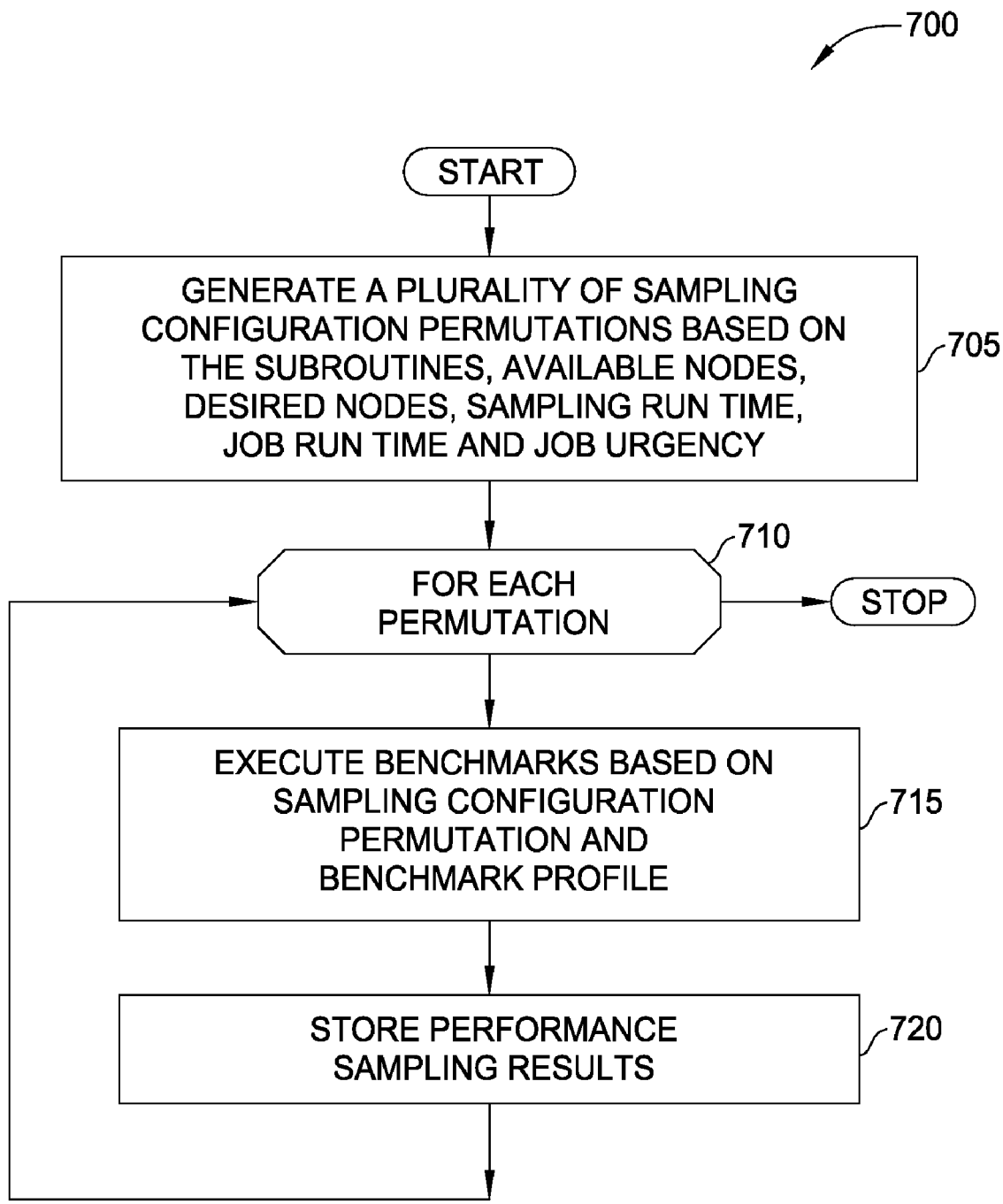
FIG. 7A is a flowchart illustrating a method for application performance sampling, according to one embodiment of the invention.

FIG. 7A is a flowchart illustrating a method 700 for application performance sampling on a distributed system 500, according to one embodiment of the invention. Before a user submits a job for processing on a distributed system 500, performance sampling may aid in determining a preferred configuration of the subroutines 514 of the job 510 on the nodes 506 of a distributed system 500.

As shown, the method 700 begins at step 705, where the permutation generator 516 generates a plurality of sampling configuration permutations based on the subroutines 514, the available nodes 208, (optionally) the desired nodes 212, the run time of the performance sampling, the run time of the compute job 510, and the urgency of the job 510. In one embodiment, the permutation generator 516 may use a brute force method for generating configurations. In other words, the permutation generator 516 generates every possible combination of distinct assignments between subroutines and nodes. Alternatively, a user may submit a desired node list 208 to narrow down the number of possible permutations as well as submit compute configurations to test.

In one embodiment, the permutation generator may consider the performance traits of nodes 506 when generating different configurations. For example, the permutation generator may generate permutations based on known performance characteristics of a given node 106. In such a case, the permutation generator may assign subroutines 514 to nodes 506 based on a matching of performance traits between the subroutines 114 and the nodes 106.

Additionally, the user may be under time constraints to execute a job 510. For example, the job 510 could be a payroll application that must run to completion before payday. Accordingly, it may be necessary to limit performance sampling so as to allow enough time to execute the payroll application on time. In such a case, the permutation generator 516 may consider the run-times of the performance sampling itself, and the job 510 in order to determine a maximum number of permutations to generate.

At step 710, a loop begins that includes steps 715 and 720. For each pass through the loop, the performance sampler 517 predicts the performance of compute job 510 for a given permutation by executing benchmarks for the subroutines 514 of the compute job 510 for that permutation.

At step 715, the performance sampler 517 executes the benchmarks for a subroutine 514, specified in the benchmark profile 310. The benchmarks execute on the nodes 506 specified in the sampling configuration for that subroutine 514. The performance sampler 517 executes each benchmark for a portion of processing cycles proportional to the ratio and scaling unit specified in the benchmark profile 310. At step 720, when the benchmarks finish processing, the performance sampler 517 stores the performance results in sampling results 230. By comparing the performance results for the benchmarks as executed in many configurations, an optimal configuration for the compute job 510 may be selected. That is, the job 510 may be executed on the nodes 506 corresponding to the permutation with the best sampling performance results.

Figure 7B:
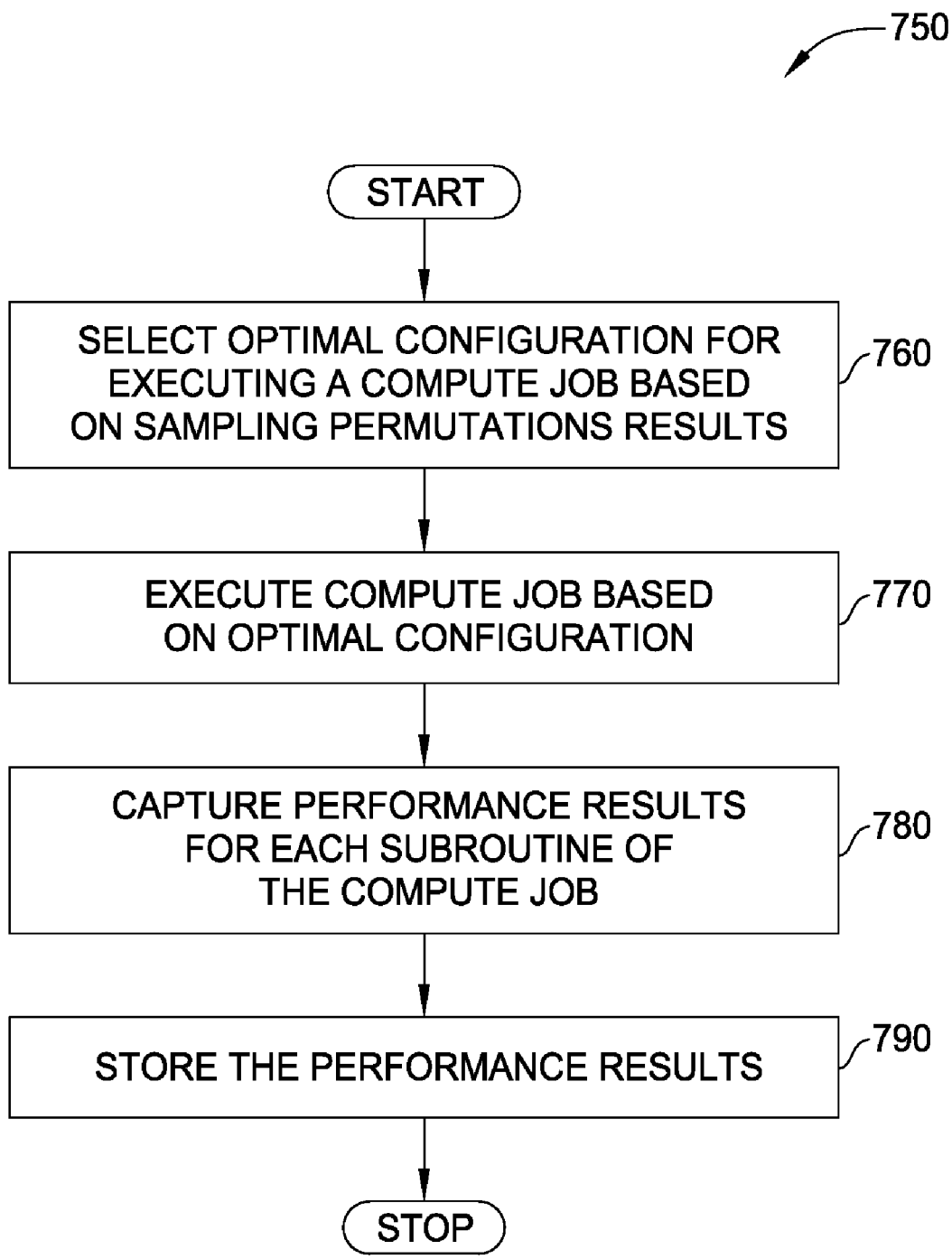
FIG. 7B is a flowchart illustrating a method for capturing performance results of a compute job, according to one embodiment of the invention.

FIG. 7B is a flowchart illustrating a method 750 for capturing performance results of a compute job 510 executed on a distributed system 500, according to one embodiment of the invention. After a user executes a job 510 according to the optimal configuration found in performance sampling, comparing actual results to the predicted results may aid in fine tuning the compute job distribution so as to further optimize job performance.

As shown, the method 750 begins at step 760, where the optimal configuration of the compute job's 510 subroutines 514 is selected from the sampling configuration permutations 220 based on the performance sampling results 230. At step 770, the user submits the compute job 510 for execution, according to the configuration selected at step 760. At step 780, the job 510 may capture the actual performance results of each subroutine 514 in compute job 510. At step 790, the job 510 may store the results in the execution permutation results (described in detail in FIG. 8).

In one embodiment, the predicted performance data of compute job 510, represented in sampling results 230 may be compared against actual execution data. Still further, the accuracy of a benchmark profile 310 may be improved over time by analysis of the execution performance of the compute job 510.

Figure 8:
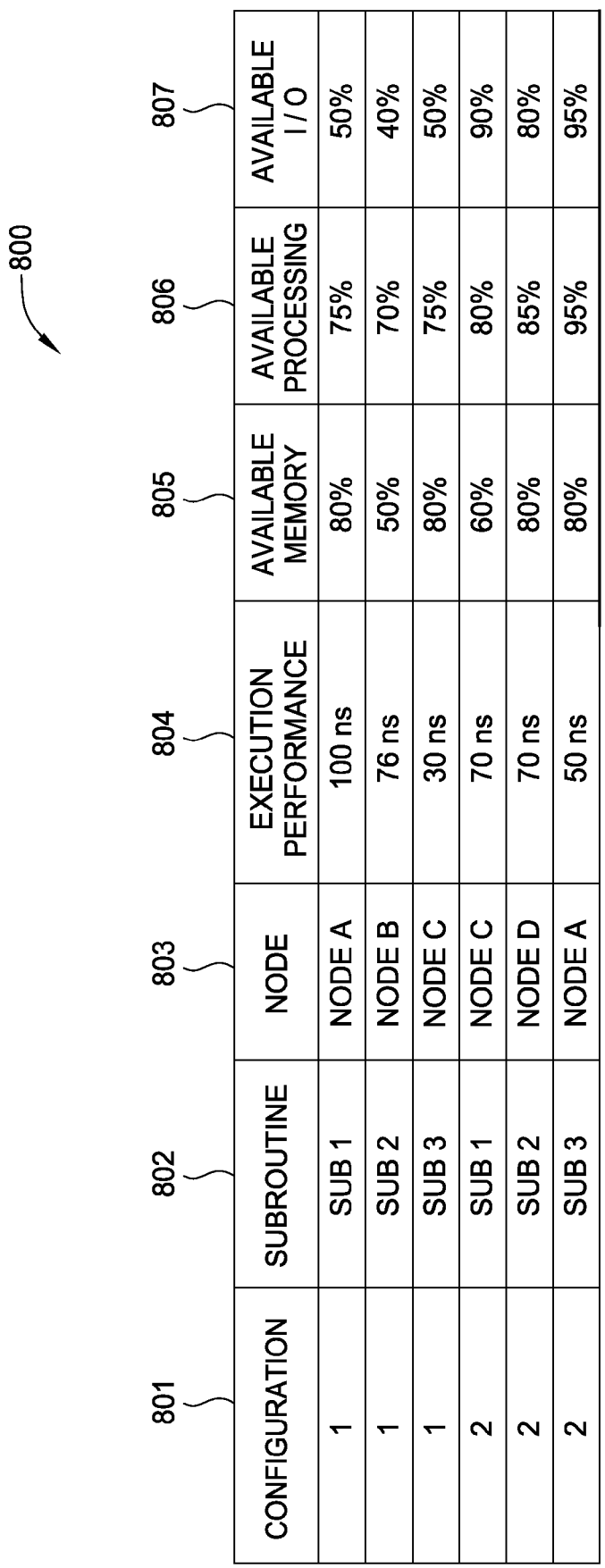
FIG. 8 illustrates an example data structure storing results of application performance sampling, according to one embodiment of the invention.

FIG. 8 illustrates an example execution results data structure 800, according to one embodiment of the invention. As shown, the execution results data structure 800 provides a table that includes a configuration ID column 801, a subroutine ID column 802, a node column 803, and an execution performance column 804, an available memory column 805, an available processing column 806, and an available I/O column 807.

Each entry in the sampling permutation results data structure 800 identifies, for a subroutine 514 of a compute job 150, which node 506 that the subroutine 514 was executed, and the performance traits of that node 506 at execution time. For example, the first row in the table indicates a configuration of "1", a subroutine of "SUB1," a node of "NODE A," a performance result of "100 ns," available memory of "80%," available processing of "75%," and available I/O of "50%." Accordingly, subroutine, "Sub 1" of job 510 executes on "Node A" in 100 nanoseconds. Further, at the time of execution, "Node A" has 80% of its memory available, 75% of its processing power available, and 50% of its I/O available. The other entries in the execution permutations results data structure 800 provide similar information for the other subroutines in the first configuration and the second configuration, "2," for performance sampling of compute job 510.

The actual execution performance of the job 510 may then be compared against the benchmark profile 310 to determine how well the job matches the benchmarks in the profile. That is, actual execution performance may be used to evaluate whether the benchmark profile 310 accurately represents the computing activity of the job 510. If significant differences are found between the actual execution performance and one of more of the benchmarks in the profile, the profile can be updated and/or the user can be notified of the differences.

While the foregoing is directed to embodiments of the present invention, other and further embodiments of the invention may be devised without departing from the basic scope thereof, and the scope thereof is determined by the claims that follow.

What is claimed is:

1. A method of identifying a preferred configuration for executing a computing job on a distributed computing system having a plurality of compute nodes, comprising:
   retrieving a benchmark profile associated with the computing job, wherein the benchmark profile identifies a collection of benchmarks representative of the processing activity of the computing job;
   generating a plurality of benchmark distribution permutations, wherein each benchmark distribution permutation specifies a configuration for executing the collection of benchmarks on one or more of the plurality of compute nodes;
   for each benchmark distribution permutation, executing the collection of benchmarks on the distributed system, as specified by a given benchmark distribution permutation; and
   recording the performance results of executing the collection of benchmarks for each different benchmark distribution permutation.

2. The method of claim 1, further comprising:
   evaluating the performance results recorded for the plurality of benchmark distribution permutations; and
   selecting a preferred configuration for executing the computing job, based on the evaluation.

3. The method of claim 2, further comprising:
   executing the computing job on the plurality of compute nodes according to the configuration specified by the preferred benchmark distribution permutation; and
   recording the performance results of executing the computing job according to the preferred benchmark distribution permutation.

4. The method of claim 3, further comprising, updating the benchmark profile on the basis of the recorded performance results of executing the computing job according to the preferred benchmark distribution permutation.

5. The method of claim 1, wherein each benchmark predicts the efficiency of a compute node, of the plurality of compute nodes, relative to a specified performance trait.

6. The method of claim 1, wherein the benchmark distribution permutations are randomly generated.

7. The method of claim 1, wherein the benchmark distribution permutations are generated based on a respective computing architecture associated with each of the plurality of compute nodes.

8. The method of claim 1, wherein the benchmark profile includes a benchmark weighting that reflects a contribution of each benchmark's processing activity to the benchmark profile, relative to other benchmarks in the benchmark profile.

9. A computer-readable storage medium containing a program configured to generate a benchmark profile used to identify a preferred configuration for executing a computing job on a distributed computing system having a plurality of compute nodes by performing an operation, the operation comprising:
   retrieving a benchmark profile associated with the computing job, wherein the benchmark profile identifies a collection of benchmarks representative of the processing activity of the computing job;
   generating a plurality of benchmark distribution permutations, wherein each benchmark distribution permutation specifies a configuration for executing the collection of benchmarks on one or more of the plurality of compute nodes;
   for each benchmark distribution permutation, executing the collection of benchmarks on the distributed system, as specified by a given benchmark distribution permutation; and
   recording the performance results of executing the collection of benchmarks for each different benchmark distribution permutation.

10. The computer-readable storage medium of claim 9, wherein the operation further comprises:
   evaluating the performance results recorded for the plurality of benchmark distribution permutations; and
   selecting a preferred configuration for executing the computing job, based on the evaluation.

11. The computer-readable storage medium of claim 10, wherein the operation further comprises:
   executing the computing job on the plurality of compute nodes according to the configuration specified by the preferred benchmark distribution permutation; and
   recording the performance results of executing the computing job according to the preferred benchmark distribution permutation.

12. The computer-readable storage medium of claim 11, wherein the operation further comprises updating the benchmark profile on the basis of the recorded performance results of executing the computing job according to the preferred benchmark distribution permutation.

13. The computer-readable storage medium of claim 9, wherein each benchmark predicts the efficiency of a compute node, of the plurality of compute nodes, relative to a specified performance trait.

14. The computer-readable storage medium of claim 9, wherein the benchmark distribution permutations are randomly generated.

15. The computer-readable storage medium of claim 9, wherein the benchmark distribution permutations are generated based on a respective computing architecture associated with each of the plurality of compute nodes.

16. The computer-readable storage medium of claim 9, wherein the benchmark profile includes a benchmark weighting that reflects a contribution of each benchmark's processing activity to the benchmark profile, relative to other benchmarks in the benchmark profile.

17. A system, comprising:
a processor; and
a memory containing a program configured to identify a preferred configuration for executing a computing job on a distributed computing system having a plurality of compute nodes, the program, when executed on the processor, performs an operation, comprising:
   retrieving a benchmark profile associated with the computing job, wherein the benchmark profile identifies a collection of benchmarks representative of the processing activity of the computing job;
   generating a plurality of benchmark distribution permutations, wherein each benchmark distribution permutation specifies a configuration for executing the collection of benchmarks on one or more of the plurality of compute nodes;
   for each benchmark distribution permutation, executing the collection of benchmarks on the distributed system, as specified by a given benchmark distribution permutation; and
   recording the performance results of executing the collection of benchmarks for each different benchmark distribution permutation.

18. The system of claim 17, wherein the operation further comprises:
   evaluating the performance results recorded for the plurality of benchmark distribution permutations; and
   selecting a preferred configuration for executing the computing job, based on the evaluation.

19. The system of claim 17, wherein the operation further comprises:
   executing the computing job on the plurality of compute nodes according to the configuration specified by the preferred benchmark distribution permutation; and
   recording the performance results of executing the computing job according to the preferred benchmark distribution permutation.

20. The system of claim 18, wherein the operation further comprises, updating the benchmark profile on the basis of the recorded performance results of executing the computing job according to the preferred benchmark distribution permutation.

21. The system of claim 17, wherein each benchmark predicts the efficiency of a compute node, of the plurality of compute nodes, relative to a specified performance trait.

22. The system of claim 17, wherein the benchmark distribution permutations are randomly generated.

23. The system of claim 17, wherein the benchmark distribution permutations are generated based on a respective computing architecture associated with each of the plurality of compute nodes.

24. The system of claim 17, wherein the benchmark profile includes a benchmark weighting that reflects a contribution of each benchmark's processing activity to the benchmark profile, relative to other benchmarks in the benchmark profile.

* * * * *